US011338561B2

(12) United States Patent
Dou et al.

(10) Patent No.: US 11,338,561 B2
(45) Date of Patent: May 24, 2022

(54) ORIENTED POLYPROPYLENE FILM WITH IMPROVED BLOCKING RESISTANCE

(71) Applicant: Toray Plastics (America), Inc., North Kingstown, RI (US)

(72) Inventors: Shichen Dou, Coventry, RI (US); Keunsuk P. Chang, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 253 days.

(21) Appl. No.: 16/818,456

(22) Filed: Mar. 13, 2020

(65) Prior Publication Data
US 2020/0215803 A1 Jul. 9, 2020

Related U.S. Application Data

(62) Division of application No. 15/940,135, filed on Mar. 29, 2018, now Pat. No. 11,198,279.

(51) Int. Cl.
| | |
|---|---|
| B32B 27/20 | (2006.01) |
| B32B 27/08 | (2006.01) |
| B29C 55/00 | (2006.01) |
| B29C 55/14 | (2006.01) |
| B29C 71/04 | (2006.01) |
| B32B 27/32 | (2006.01) |
| B29C 48/08 | (2019.01) |
| B29C 48/00 | (2019.01) |
| B29C 48/21 | (2019.01) |
| B29C 48/88 | (2019.01) |
| B29L 31/00 | (2006.01) |
| B29K 23/00 | (2006.01) |
| B29K 105/00 | (2006.01) |
| B29L 9/00 | (2006.01) |
| B29L 7/00 | (2006.01) |

(52) U.S. Cl.
CPC .......... *B32B 27/20* (2013.01); *B29C 48/0018* (2019.02); *B29C 48/022* (2019.02); *B29C 48/08* (2019.02); *B29C 48/21* (2019.02); *B29C 48/914* (2019.02); *B29C 55/005* (2013.01); *B29C 55/143* (2013.01); *B29C 71/04* (2013.01); *B32B 27/08* (2013.01); *B32B 27/32* (2013.01); *B29K 2023/06* (2013.01); *B29K 2023/12* (2013.01); *B29K 2105/0008* (2013.01); *B29K 2995/0041* (2013.01); *B29K 2995/0063* (2013.01); *B29L 2007/008* (2013.01); *B29L 2009/00* (2013.01); *B29L 2031/712* (2013.01); *B32B 2250/03* (2013.01); *B32B 2307/518* (2013.01); *B32B 2307/704* (2013.01); *B32B 2307/72* (2013.01); *B32B 2323/04* (2013.01); *B32B 2323/10* (2013.01); *B32B 2553/00* (2013.01)

(58) Field of Classification Search
CPC ......... B32B 27/20; B32B 27/08; B32B 27/32; B32B 2553/00; B32B 2307/72; B32B 2307/704; B29C 71/04; B29C 55/143; B29C 55/005; B29C 48/914; B29C 48/022; B29C 48/21; B29C 48/0018; B29C 48/08; B29L 2007/008
See application file for complete search history.

(56) References Cited

U.S. PATENT DOCUMENTS

| | | | |
|---|---|---|---|
| 4,654,240 | A | 3/1987 | Johnston et al. |
| 4,925,728 | A | 5/1990 | Crass et al. |
| 4,996,096 | A | 2/1991 | Dew |
| 5,489,473 | A | 2/1996 | Wilkie |
| 5,792,549 | A | 8/1998 | Wilkie |
| 5,798,174 | A | 8/1998 | Wilkie |
| 5,840,419 | A | 11/1998 | Alder |
| 5,981,047 | A | 11/1999 | Wilkie |
| 6,068,933 | A | 5/2000 | Shepard et al. |
| 6,074,762 | A | 6/2000 | Cretekos et al. |
| 6,465,107 | B1 | 10/2002 | Kelly |
| 6,472,077 | B1 | 10/2002 | Cretekos et al. |
| 6,682,822 | B2 | 1/2004 | Cretekos et al. |
| 7,105,233 | B2 | 9/2006 | Bechthold et al. |
| 2004/0096682 | A1 | 5/2004 | Kanamaru et al. |
| 2009/0087648 | A1 | 4/2009 | Lee |
| 2013/0212983 | A1 | 8/2013 | Bender et al. |
| 2015/0037556 | A1 | 2/2015 | Paulino et al. |
| 2015/0336359 | A1 | 11/2015 | Dou et al. |
| 2017/0044330 | A1 | 2/2017 | Luyi et al. |

(Continued)

FOREIGN PATENT DOCUMENTS

| | | |
|---|---|---|
| EP | 0435789 A2 | 7/1991 |
| JP | 2007-196497 A | 8/2007 |
| WO | 95/15850 A1 | 6/1995 |

OTHER PUBLICATIONS

"Medium-Density Polyethylene (MDPE) Properties and Applications", located at www.http://polymerdatabase.com/Polymer%20Brands/MDPE.html, visited on Mar. 1, 2021. (2 pages).

(Continued)

Primary Examiner — Samir Shah
(74) Attorney, Agent, or Firm — Morrison & Foerster LLP

(57) ABSTRACT

The present disclosure is directed to a film formulation that resulted in a substantially non-migratory cold seal release film with improved blocking resistance. Specifically, the multilayered biaxially oriented polypropylene film can include a core layer of polypropylene homopolymer; a first outer layer on one side of the core layer that can be suitable for sealing, printing, or coating; and a second outer layer on the opposite side of the core layer that is a blocking resistant layer comprising thermoplastic polymers which reduce blocking tendency.

12 Claims, No Drawings

(56) References Cited

U.S. PATENT DOCUMENTS

2019/0299578 A1  10/2019  Dou et al.
2019/0299580 A1  10/2019  Dou et al.
2020/0122443 A1   4/2020  Dou et al.

OTHER PUBLICATIONS

Dou et al., U.S. Office Action dated Jul. 6, 2021 directed to U.S. Appl. No. 15/940,135; 11 pages.
Dou et al., U.S. Office Action dated Mar. 8, 2021 directed to U.S. Appl. No. 15/940,187; 9 pages.
Dou et al., U.S. Office Action dated May 26, 2021 directed to U.S. Appl. No. 15/940,044; 9 pages.
Dou et al., U.S. Office Action dated Sep. 7, 2021 directed to U.S. Appl. No. 15/940,044; 10 pages.
Dou et al., Office Action dated Jan. 14, 2020, directed to U.S. Appl. No. 15/940,187; 15 pages.
Dou et al., Office Action dated May 13, 2020, directed to U.S. Appl. No. 15/940,187; 15 pages.
Dou et al., Office Action dated May 24, 2019, directed to U.S. Appl. No. 15/940,044; 18 pages.
Dou et al., Office Action dated May 24, 2019, directed to U.S. Appl. No. 15/940,135; 18 pages.
Dou et al., Office Action dated Sep. 19, 2019, directed to U.S. Appl. No. 15/940,044; 23 pages.
Dou et al., Office Action dated Sep. 20, 2019, directed to U.S. Appl. No. 15/940,135; 22 pages.
Dou et al., U.S. Office Action dated Feb. 19, 2020, directed to U.S. Appl. No. 15/940,135; 11 pages.
Dou et al., U.S. Office Action dated Feb. 4, 2020 directed to U.S. Appl. No. 15/940,044; 10 pages.
Dou et al., U.S. Office Action dated Aug. 24, 2020 directed to U.S. Appl. No. 15/940,135; 10 pages.
Dou et al., U.S. Office Action dated Jun. 22, 2020 directed to U.S. Appl. No. 15/940,044; 10 pages.

ORIENTED POLYPROPYLENE FILM WITH IMPROVED BLOCKING RESISTANCE

CROSS REFERENCE TO RELATED APPLICATIONS

This application is a divisional of U.S. application Ser. No. 15/940,135, filed Mar. 29, 2018, the entire contents of each of which are incorporated herein by reference.

FIELD OF THE DISCLOSURE

This disclosure relates to an oriented polypropylene film with improved blocking resistance. More specifically, this disclosure relates to a cold seal release film with an outer release layer that provides blocking and scuff resistance.

BACKGROUND OF THE DISCLOSURE

Cold seal release films are most commonly used for the outside of a multilayered packaging structure needed to be sealed under low temperature region. The cold seal release film should not form a cohesion with a cold seal adhesive layer coated onto the opposite side of the multilayered laminated packaging structure when the film is wound into a roll. As such, blocking is the unwanted adhesion between the cold seal adhesive layer and the release layer under the conditions of pressure and aging.

U.S. Pat. No. 4,925,728 describes a method of producing a fine particle-pigmented BOPP release film comprising a core layer of polypropylene homopolymer and two top release layers consisting of 98.5 to 99.6 wt % of polypropylene homopolymer and 0.4 to 1.5 wt % of polydiorganosiloxane.

Patent Application WO 1995015850A1 discloses a release label stock comprising a substrate of oriented high crystalline polypropylene and a release coating material which is an electron beam curable silicone-acrylate release material.

U.S. Pat. No. 6,465,107 describes a method of producing silicone containing LDPE resins by chemical grafting reaction and a method of incorporating a silicon-containing LDPE resin into a laminate as an outer layer by coextrusion.

U.S. Pat. No. 7,105,233 describes a method of using organo-modified polydialkylsiloxane to greatly reduce the migration of silicone oils by incorporating large alkyl groups into siloxane backbone.

U.S. Pat. Nos. 6,074,762; 6,472,077; and 6,682,822 describe a type of the outer layer of polymers based on homopolymer PP, HCPP, and HDPE, comprising essentially homopolymer or a blend of homopolymers of ethylene or propylene with silicone oils and ultra high molecular weight silicone (silicone gum) at an amount of 0.05 to 10 wt % in the release layer. Silicone oil transfer and contamination are still a problem resulting from masterbatches of silicone oils with lower viscosity.

U.S. Pat. Nos. 5,981,047; 5,798,174; 5,489,473; and 5,792,549 describe a type of cold seal release film with butene-based release materials essentially consisting of polybutene homopolymers and a blend of random copolymers or terpolymers of ethylene, butene, or propylene monomers. The release layer of the films has poor scuff resistance.

U.S. Pat. No. 5,840,419 describes a method of making printable BOPP films with two outer layers comprising ethylene-propylene copolymer and partially cross-linked polydimethylsiloxane.

SUMMARY OF THE DISCLOSURE

Applicants have discovered an economical method to improve blocking resistance of cold seal release films using stiff high crystalline polymers and avoid using migratory additives and soft release materials in the outer release layer. Specifically, none of the references cited above demonstrated that a combination of high crystalline polypropylene and low ethylene containing polybutene-1 can result in excellent release properties to a cold seal adhesive layer. In addition, partially crosslinked polydialkylsiloxane can efficiently lower and stabilize the coefficient of friction ("COF") of the outer release layer, greatly avoiding silicone oil, and silicone moieties contamination or transfer.

Blocking can be prevented by using anti-blocking agents and special thermoplastic polymers which can reduce the tendency of forming cohesion with cold seal adhesives—either natural rubber latex or synthetic rubber latex, which are rubbery materials with glass transition temperatures (Tg) lower than 0° C. Some polyolefin thermoplastic polymers and additives demonstrate blocking resistance to cold seal adhesives or pressure sensitive adhesives when they are incorporated into an outer layer of a film with a direct contact to a cold seal adhesive layer. The special polyolefin thermoplastic polymers can include high crystalline polypropylene ("HCPP", high crystallinity, isotactic content 95% or greater, Tg=0~15° C.) homopolymers, high density polyethylene ("HDPE", high crystallinity, Tg=–125° C.) homopolymers, and butene-1 containing polymers (Tg=–18° C.). The special additives can include crosslinked silicones and silicone-grafted polyolefins which have a low tendency to transfer to the opposite side of the film.

Silicones also known as polydialkylsiloxanes (most commonly used are polydimethylsiloxane ("PDMS")) have a unique chemical structure that has a backbone of silicon-oxygen (Si—O) linkages. Polydimethylsiloxane has a low glass transition temperature (Tg=–125° C.) and can be used as slip and release agents. Commercially available are silicone fluids (silicone oil and gum types of silicones) with a viscosity of from 0.65 to 2,500,000 cSt, partially cross-linked particles, fully cross-linked particles, and grafted silicone containing polyolefin polymers. Crosslinking of the polymers can significantly increase glass transition temperature. Both non-crosslinked silicone fluids and cross-linked silicones not only can provide good release properties but can also reduce the coefficient of friction of the surface layer. The difference in physical properties (especially shape and hardness) of those crosslinked and partially crosslinked silicones can show very different slip and release performance as they are used in the outer layer of a film. The drawbacks of these liquid-like silicones can include the usually undesirable cross-contamination resulting from low molecular weight silicone moieties or silicone oils transferred to the opposite side of a film.

In some embodiments, a cold seal release film includes a core layer comprising polypropylene; a first outer layer on a side of the core layer comprising polyolefin resin; and a second outer layer on a side of the core layer opposite the first outer layer comprising conventional polypropylene, high crystalline polypropylene, medium density polyethylene, or high density polyethylene; up to 40 wt. % polybutene-1; and 0.75-2.5 wt. % partially crosslinked polydialkylsiloxane. In some embodiments, the medium or high density polyethylene has a density of 0.93-0.97 g/cm$^3$. In some embodiments, the polybutene-1 is low ethylene-containing polybutene-1. In some embodiments, the low ethylene-containing polybutene-1 has an ethylene content of less than 2 mol %. In some embodiments, the low ethylene-containing polybutene-1 has a melt flow rate of 2 to 6 g/10 min. In some embodiments, the second outer layer comprises 2.5-40 wt. % polybutene-1. In some embodiments, the second outer layer comprises spherical anti-blocking agents. In some embodiments, the second outer layer comprises 1000-5000 ppm spherical anti-blocking agents. In some embodiments, the spherical anti-blocking agents comprise at least one of crosslinked silicone polymers and synthetic $SiO_2$. In some embodiments, the partially crosslinked polydialkylsiloxane is partially crosslinked polydimethylsiloxane. In some embodiments, the second outer layer has a dynamic coefficient of friction of 0.20-0.35. In some embodiments, the polypropylene in the core layer is high crystalline polypropylene. In some embodiments, the core layer comprises 2.5-25 wt. % hydrogenated hydrocarbon resins. In some embodiments, the core layer comprises 1-1000 ppm of antistatic additives. In some embodiments, the polyolefin resin comprises ethylene homopolymer, propylene homopolymer, ethylene or propylene-based copolymers and terpolymers, or blends thereof. In some embodiments, a side of the second outer layer opposite the core layer is discharge-treated using high densities of energy flux. In some embodiments, a side of the first outer layer opposite the core layer is discharge-treated.

In some embodiments, a method of forming a cold seal release film includes coextruding a laminate comprising: a core layer comprising polypropylene; a first outer layer on a side of the core layer comprising polyolefin resin; and a second outer layer on a side of the core layer opposite the first outer layer comprising conventional polypropylene, high crystalline polypropylene, medium density polyethylene, or high density polyethylene; up to 40 wt. % polybutene-1; and 0.75-2.5 wt. % partially crosslinked polydialkylsiloxane; and biaxially orienting the coextruded laminate. In some embodiments, the medium or high density polyethylene has a density of 0.93-0.97 $g/cm^3$. In some embodiments, the polybutene-1 is low ethylene-containing polybutene-1. In some embodiments, the low ethylene-containing polybutene-1 has an ethylene content of less than 2 mol %. In some embodiments, the low ethylene-containing polybutene-1 has a melt flow rate of 2 to 6 g/10 min. In some embodiments, the second outer layer comprises 2.5-40 wt. % polybutene-1. In some embodiments, the second outer layer comprises spherical anti-blocking agents. In some embodiments, the second outer layer comprises 1000-5000 ppm spherical anti-blocking agents. In some embodiments, the spherical anti-blocking agents comprise at least one of crosslinked silicone polymers and synthetic $SiO_2$. In some embodiments, the partially crosslinked polydialkylsiloxane is partially crosslinked polydimethylsiloxane. In some embodiments, the second outer layer has a dynamic coefficient of friction of 0.20-0.35. In some embodiments, the polypropylene in the core layer is high crystalline polypropylene. In some embodiments, the core layer comprises 2.5-25 wt. % hydrogenated hydrocarbon resins. In some embodiments, the core layer comprises 1-1000 ppm of antistatic additives. In some embodiments, the polyolefin resin comprises ethylene homopolymer, propylene homopolymer, ethylene or propylene-based copolymers and terpolymers, or blends thereof. In some embodiments, the method further includes discharge-treating a side of the second outer layer opposite the core layer using high densities of energy flux. In some embodiments, the method further includes discharge-treating a side of the first outer layer opposite the core layer.

In some embodiments, the release layer of the coextruded release film comprises a blend of 75 to 99.8 wt % high crystalline polypropylene (HCPP, isotactic content ≥95%) and 1 to 25 wt % low ethylene containing butene-1 polymers, and 0.2 to 1.5 wt % crosslinked silicone polymer particles or synthetic silica (SiO2) particles. In some embodiments, the release layer of the coextruded release film comprises a blend of 1 to 99.8 wt % high crystalline polypropylene (HCPP, isotactic content ≥95%) and 1 to 25 wt % low ethylene containing butene-1 polymers (PB-1), and 0.2 to 0.5 wt % crosslinked silicone polymer particles or 0.1 to 3 wt % partially crosslinked polydialkylsiloxane particles. In some embodiments, the release layer of the coextruded cold seal release film comprises a blend of 0 to 99.8 wt % high crystalline polypropylene (HCPP, isotactic content ≥95%), 0 to 99.8 wt % high density polyethylene (HDPE), and 0 to 40 wt % low ethylene containing PB-1 polymers, 0 to 40 wt % the random copolymers of ethylene, propylene or butene-1, and 0.2 to 5.0 wt % crosslinked silicone polymer particles or partially crosslinked polydialkylsiloxane particles. In some embodiments, the release layer of the coextruded cold seal release film comprises a blend of 60 to 99.8 wt % high density polyethylene (HDPE) and 1 to 40 wt % low ethylene containing PB-1 polymers, and 0.2 to 0.5 wt % crosslinked silicone polymer particles, and 0.1 to 3 wt % partially crosslinked polydialkylsiloxane particles.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

DETAILED DESCRIPTION OF THE DISCLOSURE

Blocking resistance and machinability can be crucial factors of the cold seal release films required by the end users. To achieve the objects in a cost-effective manner, Applicants discovered a cold seal release layer using thermoplastic polymers with resistance against forming cohesion with cold seal adhesives.

Cold seal adhesives are made from synthetic and natural rubbery resins and latexes as well as using effective anti-blocking and slip agents for control of coefficient of friction (COF) properties. In addition, cold seal adhesives are amorphous rubbery materials (Tg<0° C.) which are very sticky and tacky under ambient temperature environment. They are usually applied as a water-bourne latex coating onto an article (such as a film or laminate). The materials on the outer surface of a cold seal release layer can include those which are incompatible (e.g. HCPP crystals) with the cold seal adhesive layer; those which are compatible (e.g. amorphous rubbery resins, e.g. polymer tails (which are low molecular weight rubbery species)) with cold seal adhesive layer; those which are not transferable (e.g. firmly embedded inorganic anti-blocking and slip additives (do not adhere to the cold seal adhesive layer)), and those which are transferable (e.g. free particles on the top surface: e.g. silicone oils, migratory waxes and unimbedded anti-blocking and slip additives).

The material domains on the top surface of the outer release layer can include polymer crystals, amorphous polymer phase, embedded anti-blocking particles (do not adhere to the cold seal adhesive layer), debris of small molecules, rubbery or moveable polymer chain segments or tails. Both free particles (migratory) and rubbery materials can have a strong tendency to "deaden" the cold seal strength of the cold seal adhesive layer coated on the receptive substrate. "Deadening" of a cold seal adhesive means that the adhesive strength of the cold seal is weakened from contamination of the cold seal. Free particles and debris of small molecules can have a tendency to transfer onto the cold seal adhesive layer, resulting in contamination. The amorphous materials' said rubbery amorphous polymer domains, chain segments, and tails on the top surface can have a tendency to form cohesion with the molecules of the cold seal adhesive layer. Both surface contamination and cohesion could significantly deaden the cold sealing performance of a cold sealable laminate film.

The cold seal release films disclosed herein can include a core layer (B); a first outer layer (A) that can be a functional layer formulated to have properties of heat sealing, winding, adhesion, coating, and/or printing; and a second outer layer (C) that can be a release layer to provide blocking and scuff resistance. The laminate film can be coextruded and then oriented either uni-axially or biaxially in both the machine and transverse directions.

In some embodiments, the coextruded laminate release film could be a two layer film comprising a core layer and an outer release layer. The outer surface of the core layer opposite to the release layer can be discharge-treated for higher surface energy functionalities.

In some embodiments, intermediate layer(s) (D and F) comprising thermoplastic polymers can be incorporated into the structure between the core layer and at least one outer layer of the coextruded release film as special intermediate functional layers. The coextruded release film could have a four or five layer structure of A/D/B/C, A/B/D/C, A/D/B/D/C, AB/D/F/C, and A/D/F/B/C; other permutations could be contemplated as well. The intermediate layers could be used as the functional structure layer of adding gas barrier such as a layer of EVOH, adding migratory additives, or providing a function of cavitation or pigmentation.

The outer release layers disclosed herein can have various components. For example, high crystalline polypropylene ("HCPP") homopolymers can provide advantages of high stiffness, high modulus, and low residues (isotactic content ≥95%) compared to conventional polypropylene ("PP") homopolymers (isotactic content <95%, typically 90-93%). HCPP polymers are usually used as the core resin of making oriented stiff films and barrier packaging films. HCPP polymers can be difficult to uniformly orient along both machine and transverse direction during orientation processes. Commonly, processing aids, including hydrocarbon resins, polyolefin waxes, polyolefin copolymers or terpolymers of such as ethylene, propylene and butene can be added into HCPP core layer or base layer of a film at an amount of about 3 to 15 wt % of the layer blend for improving processability.

Polypropylene homopolymers used in the outer release layer of multilayered thermoplastic films can be able to provide excellent scratch and abrasion resistance due to the high surface crystallinity (hardness) of the outer top surface and relatively high Tg. A combination of high isotacticity, low xylene solubles (low molecular weight amorphous residues typically <3 wt % of the polymer, more preferably less than 2.5 wt. %), and high content of PP crystals on the top surface of the outer release layer can make the outer release layer difficult to form cohesion with the cold seal adhesive layer at the interfacial boundary. In comparison, both amorphous/rubbery materials (with high softness) and homopolymers with lower crystallinity (e.g. <95% isotacticity) and high xylene solubles (e.g. >3 wt % xylene solubles) on the top surface of an outer layer can have strong tendency (due to increased compatibility with rubbery adhesives) to form cohesion with the rubbery cold seal adhesive layer at the interfacial boundary as they have direct contact under high pressure and storage conditions, elevated temperature (e.g 50° C.) storage conditions, and lengthy storage times (e.g. 1 month to 1 year storage). High interfacial separation force (blocking force) during unwinding of a cold seal adhesive-coated film roll could deteriorate the cold sealing strength of a cold seal adhesive layer by stripping off the cold seal adhesive from the cold seal receptive layer to the cold seal release layer. In addition, there can be the danger of the cold seal adhesive-coated roll blocking entirely such that the film layers cannot be separated at all and thus, cannot be unwound for further processing.

In some embodiments, the HCPP can be in an amount of less than about 99.8 wt. %, 99 wt. %, about 95 wt. %, about 90 wt. %, about 85 wt. %, about 75 wt. %, about 65 wt. %, about 55 wt. %, or about 50 wt. % of the outer release layer. In some embodiments, the HCPP can be in an amount of more than about 50 wt. %, about 55 wt. %, about 65 wt. %, about 75 wt. %, about 85 wt. %, about 90 wt. %, about 93 wt. %, about 95 wt. %, or about 99 wt. % the outer release layer. In some embodiments, the HCPP can be about 50-99.8 wt. %, about 55-98 wt. %, about 65-98 wt. %, about 75-99 wt. %, about 85-99 wt. %, about 90-99 wt. %, about 91-95 wt. %, or about 92-94 wt. % of the outer release layer.

Examples of suitable HCPP homopolymers can include Total 3270, Total 3273, Phillips 66 CH020XK, and Braskem Inspire® 6025. Those HCPP resins can have xylene solubles at less than about 3 wt. %, less than about 2.5 wt. %, or about 2 wt %, isotactic content of >95% (preferably 98% or more) and MFR from about 2 to 4 g/10 min or about 2 to 3 g/10 min (2.16 Kg/230° C.), characterized by low content in residues and polymer tails. The HCPP can have isotactic content greater than or equal to 95%.

Orientation of HCPP polymer outer layers can be very challenging without adding processing aids, especially, as the HCPP resin has a low melt flow rate (high molecular weight and isotacticity). The HCPP outer layer could have extremely high surface roughness and irregular stretch marks due to low flowability of HCPP polymers in the skin layer during the biaxial orientation tentering process. Conventional processing aids including HCR, migratory additives, and elastomers are undesirable for adding to the HCPP-comprising outer cold seal release layer since they increase tendency to form cohesion (blocking) with the cold seal adhesive layer.

Surprisingly, Applicants discovered that polybutene polymers (e.g., PB-1 polymers) can be used as a processing aid to improve the flowability of HCPP polymers in the outer release layer at a low concentration which is the range of peel-seal and non-peelable regions of a sealable-peelable film. The polybutene in the outer release layer may not deteriorate the release performance of the HCPP polymers. To the contrary, polybutene can eliminate the negative influence of the carrier resin—e.g. homo-polypropylene and propylene copolymers—used to produce the commercial masterbatches of anti-blocking and slip agents typically added to these outer layers, such that the danger of cold seal deadening in a finished laminate roll can be avoided.

Polybutene polymer at an amount of less than about 40 wt % of the outer release layer was found to improve the stretchability and releasability of HCPP release layer due to its unique physical properties. In some embodiments, the polybutene polymer can be in an amount of less than about 40 wt. %, about 30 wt. %, about 25 wt. %, about 20 wt. %, about 10 wt. %, about 5 wt. %, or about 2.5 wt. % of the outer release layer. In some embodiments, the polybutene polymer can be in an amount of more than about 2.5 wt. %, about 5 wt. %, about 10 wt. %, about 20 wt. %, about 25 wt. %, about 30 wt. %, or about 40 wt. % the outer release layer. In some embodiments, the polybutene polymer can be about 1-40 wt. %, about 2.5-40 wt. %, about 2.5-30 wt. %, about 2.5-25 wt. %, about 2.5-20 wt. %, about 2.5-15 wt. %, or about 5-15 wt. % of the outer release layer. In some embodiments, the polybutene polymer can be about 1-40 wt. %, about 20-40 wt. %, about 25-40 wt. %, or about 30-40 wt. % of the outer release layer.

In some embodiments, the polybutene polymer can be a low ethylene-containing polybutene-1 ("PB-1") polymer. Examples of suitable PB-1 polymers can include Lyondell-Basell Toppyl® PB8340M and PB8640M polymers. Toppyl® PB8340M and PB8640M are random copolymer of butene-1 with low ethylene content (<2 mole %). They have a melt flow rate of 1.0 g/10 min. and 4.0 g/10 min. (2.16 Kg/190° C.), respectively, and two melting temperatures 97° C. and 114° C. In some embodiments, the polybutene polymer can have an ethylene content of less than about 2 mol %. In some embodiments, the polybutene polymer can have a melt flow rate of about 2-6 g/10 min (2.16 Kg/190° C.). The melting temperature (Tm) of low ethylene-containing PB-1 polymers such as the brands of LyondellBasell Toppyl® PB8640M and PB8340M is in the range of about 97 to 114° C., and the melting temperature of HCPP is about 165° C. As such, PB-1 polymers melt at temperatures lower than the melting point of HCPP. In addition, as a result of similarity in structure, PB-1 polymers and HCPP are compatible. Thus, a desirable amount of PB-1 polymer could be well dispersed in the HCPP matrix. Without being bound by any theory, it is thought that PB-1 polymer can help to "lubricate" the stretching of HCPP crystals during the tentering process of oriented film-making. The stretching temperature of the coextruded film is often higher than the $T_m$ of PB-1 polymers, but lower than the Tm of HCPP crystals. After orientation, HCPP can crystallize at higher temperatures, followed by PB-1 crystallization in the amorphous phase of HCPP in the outer layer as cooling continues. As a result of this factor, PB-1 crystal islands or domains can be well dispersed inside the amorphous phase of a predominately HCPP layer which has a tendency to reduce blocking force to cold seal adhesive layer.

Furthermore, polybutene polymers at amounts described above in the outer release layer can also be used as a processing aid for polyethylene polymers to improve stretchability and releasability. Examples of suitable polyethylene resins can include medium density polyethylene and/or high density polyethylene ("HDPE") with a density of about 0.93 to 0.97 g/cm³ (e.g., Total Petrochemicals HDPE9260 and Dow Chemicals DOWLEX™ 2027G) and a melt flow rate of about 1 to 6 g/10 min (2.16 kg/190° C.). HDPE9260 has a melt flow rate of 2.0 g/10 min. and a density of 0.96 g/cm³ and a melting point of 135° C. DOWLEX2027G has a melt flow rate of 4 g/10 min. and a medium density of 0.94 g/cm³ and a melting point of 127° C.

In some embodiments, the polyethylene can be in an amount of less than about 99.8 wt. %, 99 wt. %, about 95 wt. %, about 90 wt. %, about 85 wt. %, about 75 wt. %, about 65 wt. %, about 55 wt. %, about 50 wt. %, about 40 wt. %, about 35 wt. %, or about 30 wt. % of the outer release layer. In some embodiments, the polyethylene can be in an amount of more than about 30 wt. %, about 35 wt. %, about 45 wt. %, about 50 wt. %, about 60 wt. %, about 70 wt. %, about 80 wt. %, about 85 wt. %, or about 90 wt. % the outer release layer. In some embodiments, the polyethylene can be about 1-99.8 wt. %, about 30-95 wt. %, about 35-90 wt. %, about 50-90 wt. %, about 75-90 wt. %, about 80-90 wt. %, or about 85-90 wt. %

In some embodiments, the outer release layer can include conventional polypropylene. Examples of suitable conventional homopolypropylene ("PP") resins include Total Petrochemical Total 3271 and Total 3274, Phillipps 66 CH016 and CH020-01. In some embodiments, the PP can be in an amount of less than about 99 wt. %, about 95 wt. %, about 90 wt. %, about 85 wt. %, about 75 wt. %, about 65 wt. %, about 55 wt. %, or about 50 wt. % of the outer release layer. In some embodiments, the PP can be in an amount of more than about 50 wt. %, about 55 wt. %, about 65 wt. %, about 75 wt. %, about 85 wt. %, about 90 wt. %, about 93 wt. %, or about 95 wt. % the outer release layer. In some embodiments, the PP can be about 50-99 wt. %, about 55-98 wt. %, about 65-98 wt. %, about 75-99 wt. %, about 85-99 wt. %, about 90-99 wt. %, about 91-95 wt. %, or about 92-94 wt. % of the outer release layer.

In some embodiments, a matte-finish film surface could be achieved by adding incompatible polymers or block copolymers of ethylene and/or propylene into the outer release layer, and additives with high refractive index. Polymer flow in the outer release layer could physically roughen the surface roughness and raise the haze of the outer surface due to significant difference in refractive index. Examples of suitable matte finish materials include POLY-BATCH® DUL 3636 LTX-3 and 3636 DUL LT2 masterbatches, supplied by A. Schulman, and Ampacet 403687 and PC523A masterbatches supplied by Ampacet. Those proprietary matte-finish masterbatches are compatible with PP block copolymer, PP homopolymer, PP random copolymer, HDPE, and MDPE. In some embodiments, the matte resin masterbatch can be in the outer release layer in an amount of at least 25 wt. %, about 35 wt. %, about 45 wt. %, about 50 wt. %, about 55 wt. %, about 60 wt. %, about 65 wt. %, about 70 wt. %, or about 75 wt. %. In some embodiments, the matte resin masterbatch can be in the outer release layer in an amount of at most about 75 wt. %, about 70 wt. %, about 65 wt. %, about 60 wt. %, about 55 wt. %, about 50 wt. %, about 45 wt. %, about 35 wt. %, or about 25 wt. %. In some embodiments, the matte resin masterbatch can be in the outer release layer in an amount of about 25-75 wt. %, about 35-75 wt. %, about 45-75 wt. %, about 50-70 wt. %, or about 55-70 wt. %. To achieve satisfactory matte finish, a skin layer of ca. 2 microns can be extruded for a 12 to 15 micron thick films and 3 microns for films of more than 15 microns total thickness. In some embodiments, for achieving a matte finish, the cold seal release layer comprises predominantly a blend of HCPP, HDPE, and propylene block copolymers and anti-blocking and slip additives as well as compositions that improve blocking resistance.

Anti-blocking and slip agents can also be important to reduce blocking force and COF. These antiblocking and slip agents include spherical anti-blocking particles, such as synthetic SiO2 (e.g. SYLOBLOC® silica), crosslinked silicones (e.g. Tospearl® crosslinked silicone polymer microsphere particles), and partially crosslinked polydialkylsiloxane particles. Low and stable COF can be important for achieving good machinability of a cold seal release film. The coextruded outer skin layers (A and C) on both sides of the core layer (B) can have a thickness after biaxial orientation between about 0.1 and 3 µm, between about 0.5 and 1.5 µm, or between about 0.5 and 1.0 µm. A desirable amount of anti-blocking and/or slip agents may be added up to about 50,000 ppm to an outer layer. In some embodiments, about 300-5000 or about 2000-3500 ppm of anti-blocking agent and/or slip agents may be added to at least one outer layer. In some embodiments, the antiblock and/or slip additives used in the film are non-migratory.

Suitable inorganic anti-blocking and slip agents for the outer functional layer can include those such as spherical inorganic silicas and sodium calcium aluminosilicates. Suitable organic anti-blocking agents can include those such as cross-linked silicone polymers (polymethylsilsesquioxane, e.g. Momentive Tospearl® particles) and polymethylmethacrylate (PMMA particles), and partially cross-linked polydialkylsiloxane particles. Typically, desirable particle sizes of these anti-blocking agents can in the range of from about 1-12 µm, about 1-6 µm, about 2-5 µm, or about 2-4 µm.

Suitable anti-blocking and slip agents for the outer release layer can include those having smooth surface, low surface energy, and low tendency to transfer and stick to the adhesive layer, including spherical silica particles (SiO2) and cross-linked silicone polymer particles (Tospearl® particles). The particle sizes can be in the range of from 1-12 µm, about 1-6 µm, about 2-5 µm, or about 2-4 µm.

Suitable anti-blocking and slip agents can also include partially crosslinked polydialkylsiloxane particles, which have irregular particle surface, low surface energy, and non-flowable physical property; crosslinked silicone polymer particles; synthetic silica (SiO2) particles. The potential silicone oligomer residues/moieties inside the partially cross-linked particles can be greatly confined in the particles so that the content of mobile silicone oligomers is not substantially detrimental to the functionalities of the outer functional layer (A) and the cold sealing performance of the cold seal adhesive layer. The partially cross-linked polydialkylsiloxane particles can have the slip attribute of silicone oil but not the transference and contamination issues to the cold seal adhesive layer. Preferably, the particle sizes can be controlled in the range of about 0.5 to 10 microns and more preferably in the range of from 0.5 to 4 microns.

Partially cross-linked polydialkylsiloxane can be produced by reactive extrusion compounding process using silica treated functionalized silicone gum (ultra high molecular weight siloxane), initiator, and propylene homopolymer or copolymers. Examples of those partially cross-linked silicone gum can include EverGlide® MB-125-11 Ultra and X116EPC, provided by Polymer Dynamix. The active composition of polydialkylsiloxane in MB125-11 and X116EPC is about 25 wt % of the masterbatch. The carrier resins used in compounding MB125-11 and X116EPC were conventional homo-polypropylene and propylene copolymer, respectively. In some embodiments, the partially cross-linked polydialkylsiloxane can be partially crosslinked polydimethylsiloxane ("PDMS"). Examples of suitable partially crosslinked polydialkylsiloxane can also include Dow Corning HMB-630. The active content in HMB-6301 is 25 wt % in homo-PP carrier resin of the masterbatch. Besides partially crosslinked polydialkylsiloxane, a silica treated high molecular weight siloxane polymer can be used in the release layer. Dow Corning MB50-801 is an example of a silica modified high molecular siloxane polymer dispersed in propylene homopolymer and the active content in MB50-801 is about 50 wt %. In some embodiments, the active content in the masterbatch can be about 10-50 wt. %. The particle size of partially cross-linked silicone after the film is made is predominately in the range of from about 0.25 to 10 microns, about 0.5 to 4 microns, or about 0.5 to 2 microns.

In some embodiments, the amount of partially crosslinked polyalkylsiloxane, silica modified high molecular weight siloxane polymer, crosslinked silicone polymer particles and/or synthetic silica (SiO2) particles in the cold seal release layer can be in the range of about 0.1 to 3 wt %, about 0.2-1.5 wt. %, about 0.4 to 2.5 wt %, about 0.75-2.5 wt. %, about 0.75-1.75 wt. %, 0.75-1.25 wt. %, 0.75-1 wt. %, about 0.2-0.5 wt. %, or about 0.4-1.5 wt. %. In some embodiments, the total content of the antiblocking and slip agents in the outer release layer is less than 3 wt. %.

In some embodiments, the anti-blocking and/or slip agent can be in the release layer as a masterbatch containing a certain amount of the anti-blocking and/or slip agent. In some embodiments, the anti-blocking agent and/or slip agent masterbatch can be in the outer release layer in an amount of at least about 1 wt. %, about 2 wt. %, about 3 wt. %, about 4 wt. %, about 5 wt. %, about 6 wt. %, about 7 wt. %, about 8 wt. %, about 9 wt. %, or about 10 wt. %. In some embodiments, the anti-blocking agent and/or slip agent masterbatch can be in the outer release layer in an amount of at most about 15 wt. %, about 12 wt. %, about 10 wt. %, about 9 wt. %, about 8 wt. %, about 7 wt. %, about 6 wt. %, about 5 wt. %, about 4 wt. %, about 3 wt. %, or about 2 wt %. In some embodiments, the anti-blocking agent and/or slip agent masterbatch can be in the outer release layer in an amount of about 1-15 wt. %, 2-10 wt. %, or 4-10 wt. %.

Suitable migratory anti-blocking, antistatic, and slip agents could also be incorporated into the intermediate layer or core layer of the coextruded film at a desirable amount. Examples of those include stearates, fatty amides, and silicone oils of low molecular weight molecules, and blends thereof. Examples of suitable migratory additives can include tertiary amines, stearamide, erucamide, behenamide, glycerol monostearate, and blends thereof. Preferably, a desirable amount of from 1 to 2000 ppm migratory additives is added into the core layer or intermediate layer, more preferably, the content of migratory additive in the core or intermediate layer is in the range of from 1 to 1000 ppm.

Suitable examples of thermoplastic polymers for the outer functional layer include homopolymers of polypropylene and polyethylene resins such as Total3571, Dow DOWLEX2027G, mini-random polypropylene polymer such as LX11203, propylene copolymers such as Total 8473, and ExxonMobil Vistamaxx 3588FL and Basell Adsyl 7416 XCP, copolymers and terpolymers of ethylene, propylene and butene, and blends thereof.

Furthermore, an optional but desirable amount of fluoropolymer additive can be included in the outer layers to improve the distribution of additives and prevent die lip buildup. The content of the fluoropolymer additive can be in the range of about 100-1000 ppm of the outer or core layer, preferably 300-600 ppm of the core or outer layer. The fluoropolymer is commercially available in a masterbatch form.

The core layer (B) of the coextruded laminate film can comprise propylene homopolymers. Examples of suitable conventional homopolypropylene (PP) resins can include Total Petrochemical Total 3271 and Total 3274, Phillipps 66 CH016 and CH020-01. Examples of suitable high crystalline polypropylene resins (HCPP) can include Phillips 66

CH020XK, Total Petrochemical Total 3270 and Total 3273. Typically, these polypropylene resins can have a melt flow rate in the range of from 1.5 to 3.5 g/10 min., a melting point in the range of from 160-167° C., and a density of about 0.90-0.92 g/cm$^3$. Typically, isotactic content of the HCPP resins can be at least 95% (as measured by $^{13}$C NMR spectra obtained in 1,2,4-trichlorobenzene solutions at 130° C.; the % isotactic can be obtained by the intensity of the isotactic methyl group at 21.7 ppm versus the total (isotactic and atactic) methyl groups from 22 to 19.4 ppm) and xylene solubles can be less than 3%. The CH020XK, supplied by Phillips 66, is highly isotactic crystalline polypropylene resin (HCPP) and has a melt flow rate of 2.2 g/10 min. (2.16 Kg/230° C.), a melting temperature of 165° C., and xylene solubles of about 2%. CH020-01 homoPP has a melt flow rate of about 2.0 g/10 min. a melting temperature of about 161° C., and xylene solubles of about 4.3 wt %.

As HCPP is used as the core layer resin, an optionally desirable amount of hydrogenated hydrocarbon resin can be added into the core layer as a processing aid at an amount of from about 2.5 to 25 wt % or about 5 to 15 wt % of the weight of the core layer. Examples of suitable hydrogenated hydrocarbon resins can include Plastolyn® R1140 and Eastotac® H-142W provided by Eastman Chemicals; Oppera® PR100A provided by ExxonMobil. Typically, these hydrocarbon resins can be fully hydrogenated water-white amorphous materials having a softening point of from 130 to 150° C.; a glass transition temperature (Tg) in the range of from 75 to 90° C.; a weight-average molecular weight (Mw) in the range of from 500 to 1000 g/mole. In some embodiments, the hydrogenated hydrocarbon resins can be non-migratory.

In some embodiments, the core layer can include migratory slip and/or antistatic additives in an amount of about 1-1000 ppm. In some embodiments, the core layer can be cavitated or pigmented to satisfy the end user's requirements such as color, opacity, density, etc.

The coextruded outer skin layer (A) designed for functionalities (i.e., functional outer layer) could be formulated from polyolefin resins for the application of heat-sealing, winding, adhesion, or printing. The polyolefin resins include ethylene homopolymer, propylene homopolymer, ethylene or propylene-based copolymers and terpolymers (e.g. ethylene-propylene, ethylene-butene, propylene-butene, ethylene-propylene-butene), or blends thereof. Modified polar polyolefin resins for instance as maleic-anhydride grafted polar polyolefins or copolymerized polar polyolefin resins could also be added into the outer layers to promote adhesion, particularly as a tie-resin or tie-layer for receiving polar polymer coatings or coextruded layers.

The coextruded outer cold seal release layer (C) of the cold seal release film can be designed for both release and winding purposes. As described above, this layer can include a blend of materials offering low blocking force, low compatibility to the cold seal adhesive, low COF, and high scuff resistance. A higher MFR high crystalline polypropylene resins may be required if orientation is a problem in the tenter oven as there exists a limitation to use processing aid such as low ethylene content PB-1 polymers in the release layer. Additionally, the coextruded outer release layer (C) could be formulated to have a matte finish by adding a block copolymer blend of polypropylene and one or more other polymers (e.g. polyethylene) to provide a roughened and low gloss surface during the step of film formation. Anti-blocking and slip additives as described previously may also be added to this layer for COF control.

Generally, film properties including the COF of the release layer, release force, and cold seal strength can be evaluated under both ambient and heat-aged conditions to determine the performance of a cold seal release film. Desirable anti-blocking and slip agents can include those having low surface energy, and low adhesion/compatibility to cold seal adhesive, low stable COF under elevated temperature (i.e. hot slip COF). Ideal surface polymers for the outer release layer can include those which are incompatible with the materials in cold seal adhesive layer.

The dynamic COF of the outer release layer of a cold seal release film can be in the range of from about 0.20 to 0.35 to provide good machinability in the downstream processes. In some embodiments, the static COF (µs) can be about 0.2-0.7, about 0.2-0.6, or about 0.2-0.35. In some embodiments, the dynamic COF (µd) can be about 0.15-0.5, about 0.19-0.47, or about 0.2-0.35.

In some embodiments, a release force between the outer release layer and cold seal adhesive layer can be below about 100 g/in, below about 75 g/in, or below about 50 g/in under both conditions of ambient and heat-aged 50° C. temperatures (forced heat-aging tests simulate the release properties of the film after prolonged storage in a warehouse, for example). The cold seal strength can increase with increasing thickness of a cold seal adhesive layer. Usually, the cold seal strength of the cold seal adhesive layer with a thickness of 3.2 g/ream can be higher than about 300 g/in or about 400 g/in after unwinding (traction-separation). For a cold sealable film having a thickness of 3.6 g/ream cold seal adhesive layer, the cold seal strength can be higher than about 350 g/in or about 450 g/in.

In some embodiments, the surface of the outer release layer could be treated to crosslink the polymers and molecules on the top surface of the outer release layer and to reduce the tendency of forming cohesion with cold seal adhesive layer. Surface treatments can be conducted by using the high densities of energy flux, for example, corona, plasma, flame, and ion-electron beam treatment. Surface treatments may degrade the surface molecules of some polymers but crosslink the surface molecules of other polymers, depending on the chemistry structure of polymers on the outer layer. For example, surface treatments make polyethylene and polydimethylsiloxane resins crosslinked on the top surface layer. Crosslinking can increase glass transition temperature (Tg) and reduces motilities of polymer molecules on the top surface layer. After surface crosslinking treatment, the tendency of forming cohesion between the outer layer with polyethylene resins and the cold seal adhesive layer could be reduced greatly. Surface treatments may not effectively crosslink polypropylene resins but instead may degrade polypropylene molecules on the top surface into low molecular weight species or sticky polypropylene debris which can undesirably induce high blocking force with the cold seal adhesive.

For a typical 3-layer coextruded film, the coextrusion process can include a three-layered compositing die. The polymeric core layer (B) can be sandwiched between the outer skin layer (A) and the outer release layer (C). The outer layer (A) of three layer laminate sheet can be cast onto a chilling or casting drum with a controlled temperature in the range of from about 15 to 45° C. to solidify the non-oriented laminate sheet, followed by a secondary cooling on another chilling drum with a controlled temperature. The non-oriented laminate sheet can be stretched in the machine direction at about 95 to 165° C. at a ratio of about 4 to 6 times of the original length and then heat-set at about 50 to 100° C. to obtain a uniaxially oriented laminate sheet with minimal thermal shrinkage. The uniaxially oriented laminate sheet can be introduced into a tenter and preliminarily heated between about 130° C. and 180° C., and stretched in the transverse direction at a ratio of about 7 to 10 times of the original length and then heat-set to give a biaxially oriented sheet with minimal thermal shrinkage. Surface discharge-treatment discussed above may be applied to either layer A or layer C before rewinding the film, depending on the film product design and application use.

The total thickness of the coextruded cold seal release film after biaxial orientation could be in the range of from about 10 to 50 microns, about 12 to 30 microns, or about 15 to 25 microns. The thickness of any of the outer-most layers could be in the range of from about 0.25 to 4 microns, about 0.5 to 3 microns, about 0.5 to 2 microns, about 0.5 to 1.5 microns, or about 0.5 to 1.0 microns.

The biaxially oriented film may then be used for offline printing. The printed film may be laminated with a metallized barrier film which could be a metallized BOPP film or a polyester film with a cold seal adhesive receiving layer opposite to the metallized or laminating layer. After lamination, a cold seal adhesive could be coated on the substrate with the cold seal receptive layer; the cold seal adhesive layer can be dried at elevated temperatures and then the web may be rewound into a roll. In the wound laminated roll, the cold seal adhesive layer can directly contact the cold seal release layer, which is opposite to the cold seal adhesive layer. The processes of printing, laminating, and coating could be conducted inline or separately in different lines. The rewound roll then may be unwound in downstream sub-slitting process. The slit rolls can then be unwound to pack products at end user locations using an appropriate packaging machine.

This invention could be better understood with reference to the following examples, which are intended to illustrate specific embodiments within the overall scope of the invention.

EXAMPLES

Example 1

A 3-layer coextruded film was made on a nominal 1.6 m wide biaxial orientation line, comprising a core layer (B), an outer skin functional layer (A) on one side of the core layer, and an outer skin cold seal release layer (C) on the other side of the core layer opposite that of the skin layer (A). The core layer comprised about 90 wt % Total Petrochemical Co.'s Total 3273 HCPP resin and 10 wt % Oppera® PR100A hydrocarbon resin (HCR, supplied by ExxonMobil; the HCR was melt blended with HCPP at 50/50 ratio). The skin layer (A) comprised about 80 wt % mini-random conventional polypropylene Total LX11203 and ethylene-propylene copolymer Total 8473 supplied by Total Petrochemical Co. and about 0.06 wt % Silton® JC-30 antiblock pre-blended into Total LX11203 (Silton® JC 30 is an anti-blocking agent with nominal 3 μm particle size of a spherical sodium calcium aluminum silicate manufactured by Mizusawa Industrial Chemicals, Co., Ltd.). The outer release layer (C) comprised about 93.0 wt % Total 3571 conventional propylene homopolymer (Total 3571 has a melt flow rate of 9.0 g/10 min. (2.16 KG/230° C.), a melting temperature of 160° C., xylene solubles of about 3%, and isotacticity of <95%) and 7.0 wt % ABVT 242 SC. ABVT 242 SC is a masterbatch of 5 wt % Tospearl® 120 particles in propylene copolymer carrier resin, supplied by A. Schulman. Tospearl® 120 has a nominal 2 μm particle size of a spherical cross-linked silicone polymer supplied by Momentive Performance Materials. The total thickness of this 3-layer coextruded film after biaxial orientation was nominal 70G (17.5 μm). The thickness of the outer skin layer (A) and outer release skin layer (C) after biaxial orientation was nominal 3G (0.75 μm) and 4G (1.0 μm), respectively. The thickness of the core layer (B) is nominal 63G (15.75 μm). The outer skin layers and core layer were melt-extruded at about 230-260° C. The 3-layer coextrudate was passed through a flat die to be cast on a chill drum of about 20-26° C. The formed cast sheet was passed through a series of heated rolls at about 100-124° C. with differential speeds to stretch in the machine direction (MD) to a 4.75 stretch ratio. This was followed by transverse direction (TD) stretching to an 8.0 stretch ratio in the tenter oven at about 150-170° C. in a tenter oven. Inside the tenter oven, there are three zones for the purposes of heating, stretching, and heat-setting. The temperatures of first, second, and third zones are about 165, 155 and 150° C., respectively. After transverse stretching, the film was heat-set in the third zone to minimize thermal shrinkage, followed by a 5% relax in the transverse direction. The resultant laminate film was corona-discharge treated upon the surface of the outer skin layer (A) before it was wound into a roll form. The film was then tested for mechanical properties, printing, optical properties, COF, and cold seal release performance under ambient and heat aged conditions.

The outer release layer of the coextruded film made in Example 1 showed excellent COF but very poor cold seal release properties. At ambient condition, the release force was 219 g/in; and at heat-aged 50° C. condition, the release layer of the film was stuck to the cold seal adhesive layer of Dow Chemical COSEAL® 30061A and the film layers could not be separated. Cold seal deadening occurred due to the poor release performance of the release layer.

Example 2

Example 2 was made using the same conditions as that of Example 1. However, the outer release layer was changed to comprising 93 wt % Total 3571 conventional homopolypropylene resin and 7.0 wt % EverGlide® MB125-11Ultra supplied by Polymer Dynamix. The MB125-11 Ultra is partially cross-linked polyalkylsiloxane produced with 25 wt % active component of silicone gum by reactive extrusion compounding. The particle size of partially cross-linked silicone after the film is made is predominately in the range of from 0.5 to 2 μm. The release layer of the coextruded film showed excellent COF but poor release performance. The partially cross-linked silicone particles in the outer release layer did show good performance in COF control but did not provide sufficient release properties to the cold seal adhesive layer.

Examples 3-5

Examples 3-5 were made using the same conditions as that of Example 1. However, the outer release layer was changed to comprising LyondellBasell Toppyl® PB8340M at the content of 20 wt %, 30 wt %, and 40 wt % in the release layer (C), respectively. No change was made in the content of the Tospearl® 120 particles in the outer release layer. The release layer showed slightly higher COF as PB8340M was increased in the outer layer due to the soft characteristic of PB-1 in comparison with homopolypropylene Total 3571 resin. Compared to the coextruded film made in Examples 1 and 2, the outer release layer of the coextruded films in Examples 3 to 5 with added PB8340M polymer showed much better cold seal release performance at both ambient and heat-aged (50° C.) conditions. However, at the content of 20 wt % PB8340M, the release force is relatively high and undesirable, the cold seal strength of the cold seal adhesive layer was also negatively impacted by poor release performance after separation.

Example 6

Example 6 was made using the same conditions as that of Example 1. However, the core layer comprised about 100 wt % CH020-01 homopolypropylene resin. No change was made to the outer skin layer (A). The outer release layer (C) was changed to comprising about 93.0 wt % CH020XK high crystalline propylene homopolymer (with xylene solubles <3 wt % and isotacticity of >95%) and 7.0 wt % ABVT 242 SC (A. Schulman's Tospearl® 120 masterbatch). The outer release layer of the coextruded film showed excellent COF, a cold seal release force in the acceptable range to give good release performance at both ambient and heat-aged (50° C.) conditions. The cold seal strength of the cold seal adhesive layer was not impacted by the release performance or deadened by the release layer's composition.

Examples 7-10

Examples 7-10 were made using the same conditions as that of Example 6. However, the outer release layer was changed to comprising LyondellBasell Toppyl® PB8340M at the content of from 2.5 wt %, 5.0 wt %, 10.0 wt %, and 40 wt % in the release layer, respectively. The content of ABVT242 SC (Tospearl® 120 masterbatch) in the release layer of Example 7-9 was 4.0 wt %. The content of ABVT242 SC in the release layer of Example 10 was about 7.0 wt %. The content of HCPP in the release layer was changed accordingly to meet the total 100 wt % in the outer release layer (C). The release layer of the Examples 7-9 showed excellent COF and good release performance and cold seal strength. The outer release layer of the coextruded film made in Example 10 showed slightly higher COF as PB8340M was increased to 40 wt % in the outer release layer and excellent release performance at both ambient and heat-aged conditions. As HCPP is predominately used in the outer release layer, even if the content of low ethylene containing PB-1 polymer was as low as 2.5 wt %, the release layer of the cold seal release film showed very good release performance.

Examples 11-12

Examples 11-12 were made using the same conditions as that of Ex. 6. The outer release layer (C) of Example 11 was changed to comprising 93 wt % CH020XK, 4.0 wt % ABVT 242 SC and 3.0 wt % EverGlide® MB125-11Ultra. In Ex. 12, the partially crosslinked polydialkylsiloxane in the outer release layer (C) was replaced by 3.0 wt % Dow Corning HMB-6301, which has 25 wt % active component in homo-PP carrier resin. The outer release layer of the coextruded film made in Ex. 11 gave a release force of 24 g/in and 49 g/in at both conditions of ambient and heat-aged 50° C., respectively. After separation, the cold seal strength was 495 g/in and 514 g/in, respectively. The release layer of the coextruded film made in the Ex. 12 showed slightly higher release force and slightly lower cold seal strength.

Example 13

Example 13 was made using the same conditions as that of Ex. 11. The outer release layer of Ex. 13 was changed to comprising 94 wt % CH020XK, 4.0 wt % ABVT 242 SC and 2.0 wt % Dow Corning MB50-801. MB 50-801 is a masterbatch of 50 wt % silica treated high molecular weight siloxane polymer in homo-PP carrier resin. The outer release layer of the coextruded film made in Ex. 13 showed release forces at about 69/in and 90 g/in for ambient and heat aged conditions, respectively. Slightly lower cold seal strength was also observed for the sample in Ex. 13. It is possible that there could have been silicone oil residues or oligomers left inside the particles of partially high molecular weight siloxane polymer; these residues and oligomers could have migrated to the surface of the release layer (C) leading to a negative influence on the cold seal release force and cold seal strength.

Examples 14-15

Examples 14-15 were made using the same conditions as that of Ex. 11 except that the anti-blocking/slip agent in the outer release layer (C) was changed to comprising 4.0 wt % ABVT 242 SC and 5.0 wt % EverGlide® MB125-11 Ultra. No surface treatment was applied to the release layer of the film made in Ex. 14 while the release layer of the film made in Ex. 15 was corona discharge-treated for comparison. Wetting tension of the corona-discharge treatment of the selected surface was ca. 30-40 dyne-cm/cm$^2$. The release layer of the film made in Ex. 14 showed excellent release performance, the cold seal strength of the cold seal adhesive layer was very good too. However, the release layer of the Ex. 15 was blocked to the cold seal adhesive layer due to surface discharge treatment. In this example, the oxidative surface treatment on the HCPP release layer was found to negatively impact the release performance of the release layer to cold seal adhesive.

Examples 16-18

Example 16 was made using the same conditions as that of Example 6. However, the outer release layer was changed to comprising 52 wt % Total HDPE9260, 40 wt % LyondellBasell Toppyl® PB8640M, 4.0 wt % ABVT 242 SC, and 4.0 wt % X116EPC. HDPE9260 is high density polyethylene, supplied by Total Petrochemical Co., has a melt flow rate of 2.0 g/10 min. (2.16 Kg/190° C.) and a density of 0.96 g/cm$^3$. X116EPC is a masterbatch of partially cross-linked polyalkylsiloxane masterbatch in propylene copolymer with 25 wt % active composition. The release layer of the coextruded film made Example 116 showed excellent COF and good release performance and cold seal strength.

Example 17 was made using the same conditions as that of Example 16. However, the release layer (C) was changed to comprising 88 wt % Total HDPE9260, 5 wt % Toppyl® PB8640M, 4.0 wt % ABVT242 SC, and 3.0 wt % X116EPC. The outer release layer of the coextruded film showed low COF, and release forces of 53/gin and 139 g/in under both ambient and heat aged conditions, respectively. The COF of the release layer was slightly lower as PB8640M loading was reduced from 40 wt % to 5.0 wt 0% in the outer release layer. The release performance of Example 17 was slightly worse than that of Example 16, especially under heat-aged 50° C. condition.

Example 18 was made using the same conditions as that of Example 17. No change was made to the recipes and conditions except that the release layer of the coextruded film was corona discharge-treated for comparison. Wetting tension of the corona-discharge treatment of the selected surface was ca. 30-40 dyne-cm/cm$^2$. It was found that at ambient condition the release layer showed excellent release performance and the cold seal strength, while at heat-aged 50° C. condition, the release layer was blocked to the cold seal adhesive layer.

Examples 19-20

Examples 19-20 were made using the same conditions as that of Example 16. The outer release layer (C) of the Examples 19 and 20 was changed to comprising 86 wt % DOWLEX®2027G, 4.0 wt % Tospearl 120 MB (the same as in Example 16) and 10 wt % XI 16EPC. DOWLEX®2027G, supplied by Dow Chemical Co., is linear medium density polyethylene (MDPE) with a melt flow rate of 4.0 g/10 min. (2.16/190° C.) and a density of 0.94 g/cm³. The outer release layer of the film made in the Example 19 was not corona discharge-treated while the release layer of the Example 20 was corona discharge-treated. Wetting tension of the corona-discharge treatment of the selected surface was ca. 30-40 dyne-cm/cm². The release layer of the coextruded film made in Example 19 was blocked to the cold seal adhesive layer at both ambient and 50° C. heat aged conditions. Adhesive failure occurred in the process of separation. The release layer of the film made in Example 20 showed excellent release performance, the cold seal strength of the cold seal adhesive layer was very good after release—separation. The release performance was significantly improved with corona discharge-treatment in this set of examples using MDPE.

Examples 21-24

Example 21 was made using the same conditions as that of Example 16. The outer release layer (C) was changed to comprising 56 wt % POLYBATCH® DUL 3636 LTX-3, 40.0 wt % Toppyl® PB8640M, 4.0 wt % ABVT 242 SC. The DUL 3636 LTX-3 was supplied by A Schulman as a proprietary matte finish masterbatch. It is compatible with PP block copolymer, PP homopolymer, PP random copolymer, HDPE, LDPE and LLDPE.

Example 22 was made using the same conditions as that of Example 21. The outer release layer was changed to comprising 66 wt % DUL363LTX3, 30.0 wt % Toppyl PB8640M, 4.0 wt % ABVT 242 SC.

As a result of adding matte finish masterbatch into the outer release layer, the release layer has a rough surface and much lower gloss. The coextruded film also provided high haze property. No polydialkylsiloxane additive was added into the outer release layer. The total amount of anti-blocking agent in the release layer is relatively low. The outer release layer of Example 22 showed slightly lower release force than Example 21 and slightly higher cold seal strength after release.

Example 23 was made using the same conditions as that of Examples 21. The outer release layer was changed to comprising 56 wt % DUL 3636 LTX3, 40 wt % Toppyl PB8640M, and 4.0 wt % X116EPC.

Example 24 was made using the same conditions as that of Example 23. The outer release layer was changed to comprising 66 wt % DUL 3636 LTX3, 30 wt % Toppyl 8640M and 4.0 wt % X116EPC.

The content of partially cross-linked polydialkylsiloxane particles in the outer release layer was about 1.0% wt % in Examples 23-24 and no Tospearl® 120 particle was added into the outer release layer. The outer release layer of the coextruded films Examples 23-24 has low COF and a matte finish. The outer release layer of the two film samples showed good release properties at both ambient and heat-aged (50° C.) conditions.

Examples 25-26

Examples 25-26 were made using the same conditions as that of Example 21. The outer release layer (C) was changed to comprising 56.0 wt % CH020XK, 36.0 wt % DOWLEX®2027G, 4.0% ABVT242SC and 4.0% MB125-11 Ultra. The outer release layer of the film in Ex. 25 was not corona discharge-treated while the outer release layer of the film in Ex. 26 was corona discharge-treated for comparison. Wetting tension of the corona-discharge treatment of the selected surface was ca. 30-40 dyne-cm/cm².

The outer release layer of the coextruded films Ex. 25 and 26 showed a matte finish similar to that seen Ex. 21-24, but a lower COF, compared to Ex. 21-24 due to the high content in anti-blocking agents as well as high crystallinity of the polymers in the release layer. At ambient condition, the release force of the outer release layer of Ex. 25-26 was in the normal range desirable for cold seal release film, while at heat-aged 50° C. condition, both film samples showed high blocking force, especially, corona treatment on the outer release layer with added HCPP resin increased the blocking force and deteriorated cold seal performance.

The following Tables provide the compositions and properties of Examples 1-26 described above. In Table 1, Cony PP(conventional polypropylene)=Total 3271; HCPP (high crystalline polypropylene)=Phillips 66 CH020XK; PE (polyethylene)=Total HDPE9260 or Dowlex 2027G; PB-1 (polybutene)=Toppyl PB8340M or PB8640M; Matte MB (matte resin masterbatch)=Polybatch DUL3636 LTX-3; AB MB (antiblock additive masterbatch)=ABVT 242SC; and SG MB (silicone gum masterbatch)=Everglide MB125-11 Ultra or X116EPC; or Dow Corning MB50-801.

TABLE 1

| | All components in wt % | | | | | | |
|---|---|---|---|---|---|---|---|
| Example | Conv PP | HCPP | PE | PB-1 | Matte MB | AB MB | SG MB |
| 1 | 93 | — | — | — | — | 7 | — |
| 2 | 93 | — | — | — | — | — | 7 |
| 3 | 73 | — | — | 20 | — | 7 | — |
| 4 | 63 | — | — | 30 | — | 7 | — |
| 5 | 53 | — | — | 40 | — | 7 | — |
| 6 | — | 93 | — | — | — | 7 | — |
| 7 | — | 93.5 | — | 2.5 | — | 4 | — |
| 8 | — | 91 | — | 5 | — | 4 | — |
| 9 | — | 86 | — | 10 | — | 4 | — |
| 10 | — | 53 | — | 40 | — | 7 | — |

TABLE 1-continued

| | All components in wt % | | | | | | |
|---|---|---|---|---|---|---|---|
| Example | Conv PP | HCPP | PE | PB-1 | Matte MB | AB MB | SG MB |
| 11 | — | 93 | — | — | — | 4 | 3 |
| 12 | — | 93 | — | — | — | 4 | 3 |
| 13 | — | 94 | — | — | — | 4 | 2 |
| 14 | — | 91 | — | — | — | 4 | 5 |
| 15 | — | 91 | — | — | — | 4 | 5 |
| 16 | — | — | 52 | 40 | — | 4 | 4 |
| 17 | — | — | 88 | 5 | — | 4 | 3 |
| 18 | — | — | 88 | 5 | — | 4 | 3 |
| 19 | — | — | 86 | — | — | 4 | 10 |
| 20 | — | — | 86 | — | — | 4 | 10 |
| 21 | — | — | — | 40 | 56 | 4 | — |
| 22 | — | — | — | 30 | 66 | 4 | — |
| 23 | — | — | — | 40 | 56 | — | 4 |
| 24 | — | — | — | 30 | 66 | — | 4 |
| 25 | — | 56 | 36 | — | — | 4 | 4 |
| 26 | — | 56 | 36 | — | — | 4 | 4 |

In the following Table 2, PB-1 is the label of low ethylene-containing polybutene-1 polymers; T120 is the label of Tospearl® 120 particles; X-Sil is the label of partially crosslinked polydialkylsiloxane particles or silica treated high molecular weight siloxane polymer; COF is the static and dynamic COF (μs and μd) of the outer release layer (C) of the coextruded films measured at ambient temperature; release force (grams/inch) was labeled as Rel. f. (g/in) and cold seal strength (grams/inch) was labeled as CSS (g/in). Both the release force and cold seal strength were measured at ambient temperature while the blocked samples of the coextruded films were prepared in advance at either ambient (22° C.) and heat aged (50° C.) conditions. "Blocked" in the Tables means that the cold seal strength of the samples could not be measured effectively because the cold seal adhesive layer was extremely deteriorated due to blocking. Treatment (A/C) indicated that the outer surface layer was corona discharge-treated at a power supply output of 1.0 kilowatts on the outer functional layer (A) or on both outer layers (A/C).

TABLE 2

| | Active component (wt %) | | | COF | | Ambient (22° C.) | | Heat aged (50° C.) | | Treatment |
|---|---|---|---|---|---|---|---|---|---|---|
| Examples | PB-1 | T120 | X-Sil | μs | μd | Rel. f. (g/in) | CSS (g/in) | Rel. f. (g/in) | CSS (g/in) | (A/C) |
| Ex. 1 | | 0.35 | | 0.25 | 0.24 | 219 | 479 | Blocked | | A |
| Ex. 2 | | | 1.75 | 0.25 | 0.21 | 192 | 527 | Blocked | | A |
| Ex. 3 | 20 | 0.35 | | 0.35 | 0.29 | 95 | 599 | 154 | 451 | A |
| Ex. 4 | 30 | 0.35 | | 0.45 | 0.34 | 38 | 592 | 54 | 540 | A |
| Ex. 5 | 40 | 0.35 | | 0.50 | 0.47 | 17 | 600 | 41 | 619 | A |
| Ex. 6 | | 0.35 | | 0.30 | 0.21 | 66 | 584 | 59 | 550 | A |
| Ex. 7 | 2.5 | 0.2 | | 0.28 | 0.22 | 30 | 545 | 52 | 552 | A |
| Ex. 8 | 5 | 0.2 | | 0.27 | 0.24 | 24 | 562 | 53 | 588 | A |
| Ex. 9 | 10 | 0.2 | | 0.30 | 0.26 | 29 | 553 | 103 | 538 | A |
| Ex. 10 | 40 | 0.35 | | 0.50 | 0.39 | 14 | 635 | 40 | 845 | A |
| Ex. 11 | | 0.2 | 0.75 | 0.27 | 0.23 | 24 | 495 | 49 | 514 | A |
| Ex. 12 | | 0.2 | 0.75 | 0.24 | 0.20 | 34 | 434 | 54 | 448 | A |
| Ex. 13 | | 0.2 | 1.0 | 0.25 | 0.21 | 89 | 421 | 90 | 412 | A |
| Ex. 14 | | 0.2 | 1.25 | 0.28 | 0.23 | 20 | 628 | 29 | 587 | A |
| Ex. 15 | | 0.2 | 1.25 | 0.28 | 0.23 | 193 | 578 | Blocked | | A/C |
| Ex. 16 | 40 | 0.2 | 1 | 0.50 | 0.36 | 32 | 580 | 65 | 524 | A |
| Ex. 17 | 5 | 0.2 | 0.75 | 0.26 | 0.23 | 53 | 446 | 139 | 234 | A |
| Ex. 18 | 5 | 0.2 | 0.75 | 0.29 | 0.23 | 27 | 499 | Blocked | | A/C |
| Ex. 19 | | 0.2 | 25 | 0.30 | 0.28 | Blocked | | Blocked | | A |
| Ex. 20 | | 0.2 | 25 | 0.31 | 0.26 | 13 | 615 | 78 | 579 | A/C |
| Ex. 21 | 40 | 0.2 | | 0.58 | 0.38 | 46 | 488 | 135 | 490 | A |
| Ex. 22 | 30 | 0.2 | | 0.52 | 0.34 | 42 | 800 | 72 | 542 | A |
| Ex. 23 | 40 | | 1 | 0.31 | 0.29 | 25 | 571 | 48 | 582 | A |
| Ex. 24 | 30 | | 1 | 0.27 | 0.28 | 23 | 521 | 38 | 495 | A |
| Ex. 25 | | 0.2 | 1 | 0.23 | 0.22 | 35 | 460 | 115 | 366 | A |
| Ex. 26 | | 0.2 | 1 | 0.21 | 0.19 | 45 | 488 | Blocked | | A/C |

Test Methods

The various properties in the above examples were measured by the following methods:

COF Test: The outer release layer (C) of the coextruded films made in Examples and was tested under ambient temperature condition to determine the static and dynamic COF (μs and μd) using the method of ASTM D1894.

Wetting Tension Test: Wetting tension of the selected corona discharge-treated surfaces were measured using the method of ASTM D2578.

Blocking Test: To achieve a good quality and consistent hand-drawdown coatings of cold seal adhesives for easy handling and avoiding wrinkles, a stiff polyethylene extrusion-laminated template sheet was produced for blocking and cold seal strength test using Torayfan® biaxially oriented polypropylene films TC01/60G and Torayfan® F62W/70G, which are commercially available from Toray Plastics (America), Inc. Torayfan® TC01/60G is a two-side treated biaxially oriented polypropylene film comprising a core layer and two outer layers. Torayfan® F62W/70G is one-side treated biaxially oriented polypropylene film comprising a core layer and two outer layers. The thickness of the LDPE extrudate adhesive used in the lamination was about 10 #/ream and about 60G in thickness, the extrusion lamination was conducted at extrusion temperature 315° C. and lamination speed 500 ftpm. The laminate has a structure of TC01/10 #LDPE/F62W and a total thickness of 210G. The corona treated side of TC01 was laminated to F62W's discharge-treated printable side of the film; the exposed ultra-high surface energy (UHSE) side of the TC01 film after lamination was used as the cold seal receptive layer for hand-drawdown coating of the cold seal adhesive latexes. Dow Chemical COSEAL™ 30061A was used to prepare drawdown coating for blocking tests. The COSEAL™ 30061A cold seal adhesive is a water-based milky-white synthetic latex adhesive with a solids content of 59.1±1 wt %.

The hand-drawdown coating of the cold seal latex was applied using Mayer Rod #6 and COSEAL™ 30061A cold seal adhesive, which give a coat weight of about 3.5 to 3.7 #/ream. After the drawdown was complete, the laminate template was dried in a 120° C. oven for 5 seconds and then the coated template was cooled down in ambient temperature condition. The outer release layer (C) of a cold seal release film test sample was then positioned to contact and stacked onto the cold seal adhesive coated layer of the laminate template. A maximum of 12 stacks separated by a sheet of A4 paper of the stacked samples were inserted into a blocking jig for varying test conditions (The blocking jig was manufactured by Koehler Instruments Co.). The blocking area of the blocking jig was ca. 1 inch diameter for a blocking area of ca. 0.785 sq. inches. The conditions for ambient include that a temperature of about 22° C., 16 hrs duration time, compression pressure 100PSI (the head of blocking jig on the stacked samples). Under heat-aged condition, the blocking jig was put into an oven with a 50° C. setting temperature. The duration time and compression pressure were the same as that of ambient condition.

After blocked samples were prepared under either ambient or heat-aged conditions described above, the blocked samples were cut into one inch wide stripes and then tested at ambient temperature using Instron™ (90° peeling angle) for measuring the force to separate the two test film from the laminate template (aka the release force), averaging the data of three blocked sample strips. The cold seal adhesive layer of the separated samples was sealed to itself using a Sentinel™ Sealer under the conditions of 80 PSI pressure/0.5 second dwell time/serrated jaws/ambient temperature. The sealed strips were tested for cold seal strength using Instron™ tester, measuring the force to peel apart the cold-sealed films (aka cold seal strength).

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that a film has at most about 10 wt. %, about 15 wt. %, or about 20 wt. % of a component is meant to mean that the formulation has at most about 10 wt. %, at most about 15 wt. %, or at most about 20 wt. % of a component.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A method of forming a cold seal release film comprising:
   coextruding a laminate comprising:
      a core layer comprising polypropylene;
      a first outer layer on a side of the core layer comprising polyolefin resin; and
      a second outer layer on a side of the core layer opposite the first outer layer consisting of 53-93.5 wt. % high crystalline polypropylene having an isotactic content greater than 95%; 2.5-40 wt. % polybutene-1; incompatible propylene polymers or block copolymers of propylene; and 1000-5000 ppm spherical anti-blocking agents; and
   biaxially orienting the coextruded laminate.

2. The method of claim 1, wherein the polybutene-1 is low ethylene-containing polybutene-1.

3. The method of claim 2, wherein the low ethylene-containing polybutene-1 has an ethylene content of less than 2 mol %.

4. The method of claim 2, wherein the low ethylene-containing polybutene-1 has a melt flow rate of 2 to 6 g/10 min.

5. The method of claim 1, wherein the spherical anti-blocking agents comprise at least one of crosslinked silicone polymers and synthetic SiO2.

6. The method of claim 1, wherein the second outer layer has a dynamic coefficient of friction of 0.20-0.35.

7. The method of claim 1, wherein the polypropylene in the core layer is high crystalline polypropylene.

8. The method of claim 1, wherein the core layer comprises 2.5-25 wt. % hydrogenated hydrocarbon resins.

9. The method of claim 1, wherein the core layer comprises 1-1000 ppm of antistatic additives.

10. The method of claim 1, wherein the polyolefin resin comprises ethylene homopolymer, propylene homopolymer, ethylene or propylene-based copolymers and terpolymers, or blends thereof.

11. The method of claim 1, further comprising discharge-treating a side of the second outer layer opposite the core layer using high densities of energy flux.

12. The method of claim 1, further comprising discharge-treating a side of the first outer layer opposite the core layer.

\* \* \* \* \*